May 1, 1962 R. M. SCANZANI 3,032,681

MAGNETRON DEVICE

Filed Dec. 22, 1958 3 Sheets-Sheet 1

INVENTOR.
ROBERT M. SCANZANI
BY Edgar O. Rost
ATTORNEY

May 1, 1962 R. M. SCANZANI 3,032,681

MAGNETRON DEVICE

Filed Dec. 22, 1958 3 Sheets-Sheet 2

INVENTOR.
ROBERT M. SCANZANI
BY Edgar O. Rost
ATTORNEY

INVENTOR.
ROBERT M. SCANZANI
BY Edgar O. Rost
ATTORNEY

1

3,032,681

MAGNETRON DEVICE

Robert M. Scanzani, Beverly, Mass., assignor to Bomac Laboratories Inc., Beverly, Mass., a corporation of Massachusetts Filed Dec. 22, 1958, Ser. No. 782,058
3 Claims. (Cl. 315—39.61)

The present invention relates generally to electron discharge devices of the magnetron type and more particularly to a novel tuning structure for such devices.

Prior art magnetrons of the multicavity resonator configuration may be tuned by various tuning structures, commonly grouped under the inductive or capacitive systems. The theory and explanation of such systems has been described in the text "Microwave Magnetrons," vol. 6, Radiation Laboratory Series, McGraw-Hill Book Co., Inc., New York 1948, at pages 561 to 575. Conventionally, rods, pins or rings are introduced within the cavity resonators to thereby vary the electrical parameters over a range of selected resonant frequencies.

A multicavity configuration which has evolved in present day devices is the "rising-sun" anode design incorporating alternate large and small cavities radially disposed around a common axis. An example of a tuning structure for this design is shown in U.S. Patent 2,838,712, issued to Richard S. Briggs, on June 10, 1958 and assigned to the assignee of the present invention. It will be noted that extremely tight mechanical tolerances must be maintained to achieve the structure necessary to tune such magnetrons. The critical spacings have, therefore, limited the development of magnetron devices, particularly at the higher frequency bands.

An object of the present invention is, therefore, to provide a novel tuning structure for a multicavity magnetron.

A further object is to provide a novel tuning structure for a rising-sun type magnetron.

Another object is to provide a novel tuning structure for a magnetron that is simple to fabricate and operates with improved efficiency.

The invention attains the objects enumerated in an illustrative embodiment having a multicavity resonator of the rising-sun type by means of an external tuning arrangement disposed between the outer cylindrical wall of the resonator and an outer coaxial shell surrounding the resonator. The large resonator cavities are provided with coupling slots in the rear boundary walls and tuning members cooperate with the slots to inductively tune the magnetron.

A feature of the invention resides in the mechanical structure which avoids the critical tolerances necessary for tuning the magnetron in the region between the inner cavity walls. The construction of the illustrative embodiment also simplifies fabrication considerably in that the inner magnetic pole member may be fixed rather than movable and the number of individual brazing operations may be considerably reduced. In addition the construction of the embodiment lends itself to a simplified method of providing the multicavity resonator with the slots in the outer cylindrical wall.

Other objects, features and advantages will be appreciated after consideration of the following detailed description and accompanying drawings, in which.

2

Figure 4:
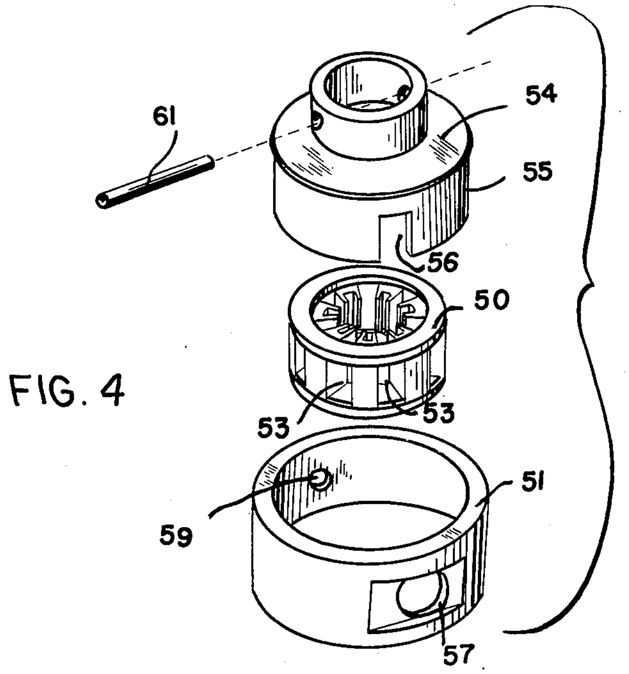
FIG. 4 is an exploded view of an alternative embodiment of the tuning structure together with associated components.
Figure 5:
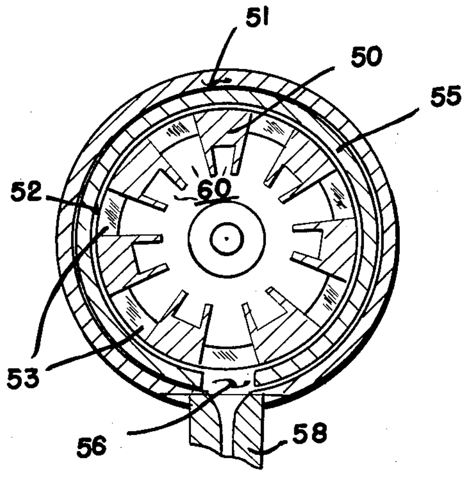

FIG. 5 is a detailed cross sectional view of the assembled structure shown in FIG. 4.

Referring to the drawings the magnetron shown incorporates a multicavity rising-sun resonator anode member 1 surrounding a cathode electrode 2. Anode member 1 comprises a main cavity section 3 including wall structure defining alternate large cavities 4 and smaller cavities 5 radially disposed around an axial center passageway 6 wherein the cathode 2 is disposed. An outer cylindrical wall 7 forms the boundary of the main inner cavity resonator system. End rings 8 and 9 are disposed on opposite flat surfaces of the main section 3 and are integral therewith. The anode is mounted by means of a bottom support plate 10 defining a shoulder 11. A braze joint between end ring 9 and shoulder 11 permanently secures the anode positioning. A magnetic pole piece 12 extends axially through support plate 10 and the conductor leads for the cathode 2 extend coaxially within the pole piece tubular extension 13.

A second or upper support plate 14 is secured as by brazing to the end ring 8 and another magnetic pole piece 15 with tubular extension 16 is attached thereto. In accordance with this arrangement the magnetic member 15 is now rigidly secured whereas prior art tuning arrangements necessitated this component being adapted to move. A transverse slot 17 is provided in the pole piece extension 16 with the dimensions of the slot determined by the length of travel of the tuning member to achieve the desired tuning range of the magnetron tube. A conventional bellows 18 of a deformable metal is hermetically sealed between plate 14 and the tuning member to be described to preserve the vacuum condition of the complete tube.

Figure 1:
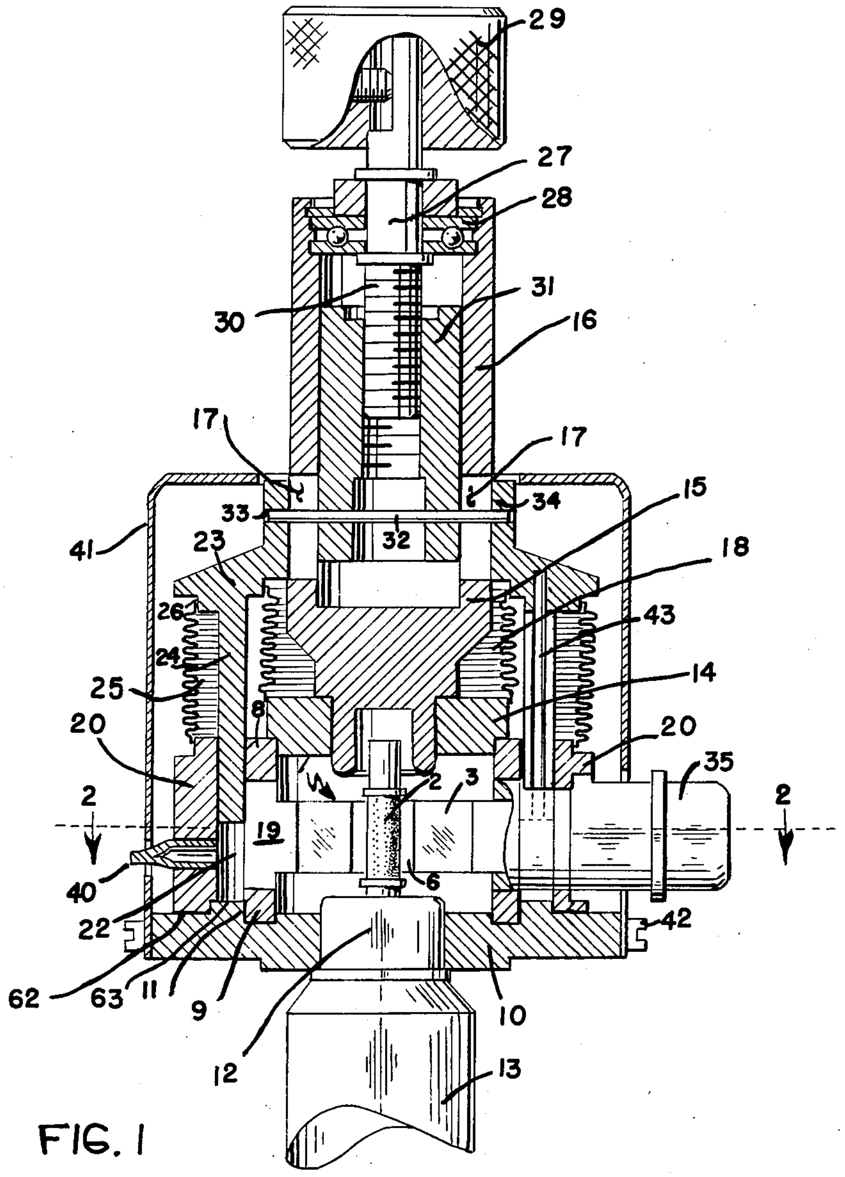
FIG. 1 is a detailed longitudinal cross sectional view of the illustrative embodiment.
Figures 2, 3:
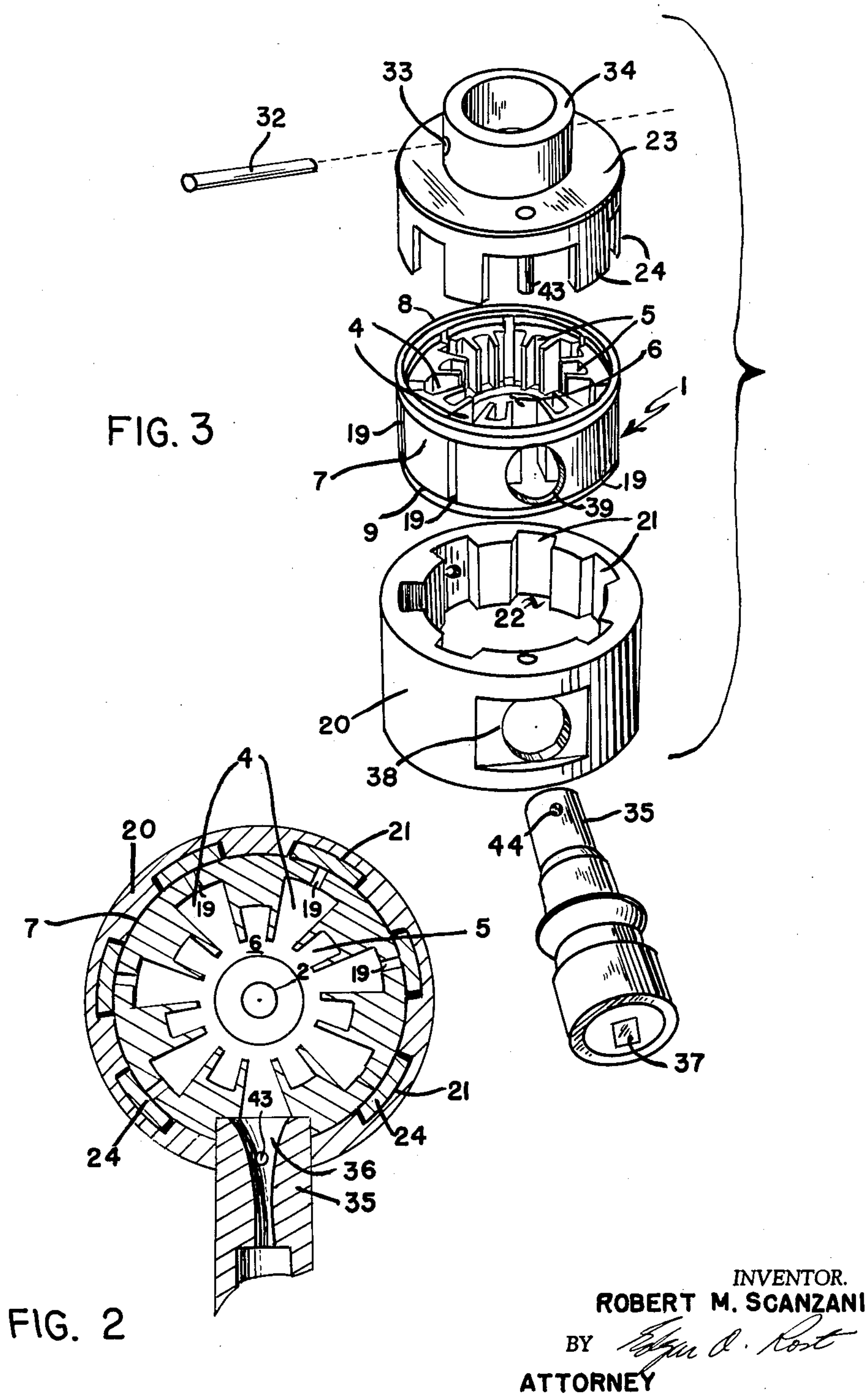
FIG. 2 is a view along the line 2—2 in FIG. 1.
FIG. 3 is an exploded view of the tuning structure and associated components.

Referring now to FIGS. 2 and 3 the novel tuning arrangement of the invention will be described. Anode member 1 is provided with a plurality of coupling slots 19 parallel to the anode axis in the outer wall 7, each slot communicating with one of the larger cavities 4. One of the features of the embodiment lends itself to a simplified manufacturing process, in that after the necessary configuration of the anode cavities is determined including the width of the slots 19, the conventional hobbing operating will ensue to form the main section 3. Control of the height of the cavities may then be achieved by boring out the main section 3 at each end. End rings 8 and 9 are then brazed to the opposed end faces to form an integral assembly. The assembly will then be turned down by standard machine practices until the slots in wall 7 are broken through and the desired overall diameter is achieved. In this manner a rising-sun anode configuration may be provided with slots to couple the cavities to the external tuning structure.

The anode member 1 is mounted coaxially within an outer cylindrical member 20 having a plurality of radially disposed recessed wall structures 21 defining together with the outer wall 7 a plurality of external cavities 22. The height of cavities 22 is approximately equal to the overall height of the anode member 1 including the end rings 8 and 9. The width of the cavities will be noted to be approximately equal to a dimension resulting from two lines following the divergent wall path on each side of the larger cavities and then measuring between the lines. Hence, in effect, the invention results in an extension of the rear boundary wall for each large cavity. The outer member 20 will be accurately spaced from the anode by means of a step 63 in plate 10 and is permanently secured by means of a brazed joint as at 62.

A tuning assembly or crown 23 comprises a cylindrical dome-shaped section having a plurality of spaced elements 24 extending downwardly parallel to the anode axis. Each element 24 is dimensioned to make good electrical contact with all wall surfaces of the external cavities throughout the tuning range of the magnetron. To assure proper contact it may be desirable to taper the elements 24 or fabricate them from a metal having low fatigue and excellent resilience, such as beryllium copper. The tuning assembly then is the only movable component and a second bellows 25 is joined at one end to outer member 20 while the other end is joined to shoulder 26 in the tuning assembly 23. Bellows 25 together with bellows 18 permits vertical movement of the tuning assembly without loss of the vacuum within the magnetron tube.

To complete the overall magnetron assembly the means for activating the tuning structure will now be described. The tubular pole piece extension 16 is enclosed at the outer end by a shaft 27 and bearing 28 arrangement together with knob 29. The inner end of shaft 27 is threaded as at 30 to engage cylindrical bearing member 31. Rotation of knob 29 will, therefore, result in only vertical displacement of the bearing member 31. Tuning assembly 23 will engage the bearing member 31 and be locked thereto by means of a pin 32 extending through a transverse hole 33 in shank portion 34, a slot 17 in extension 16 and a second hole in bearing 31 aligned with hole 33. The tuning elements 24, therefore, will be displaced within the external cavities 22 to thereby cover an increasing portion of the slots as the tuning assembly moves downwardly and alter the inductance of the resonant circuit.

The magnetron power will be coupled into the desired load circuit by means of an output pipe 35 with transformer 36 and window 37. The output pipe 35 extends through an opening 38 in member 20 as well as opening 39 in anode member 1 with individual braze joints to the cylindrical members and inner cavity walls of the anode as necessary. The output system has further provision for a compensating pin 43 which extends into a hole 44 in pipe 35. Pin 43 assists in matching the magnetron circuit to the load circuit and compensates for the absence of a resonant cavity due to the presence of the output pipe.

After completion of the assembly, the magnetron tube is evacuated by means of tubulation 40 and a guard 41 may be secured to plate 10 by screws 42. The conventional magnets, as well as pole piece adapters have been omitted since such structure is well within the realm of the art.

Turning now to FIGS. 4 and 5 an alternative embodiment is shown comprising a tuning arrangement in which the inner anode member 50 of the rising-sun configuration is spaced from the outer cylindrical member 51 to define a circular external resonant cavity 52. Slots 53 in the rear boundary wall of anode 50 couple the inner resonant circuit system 60 to the external cavity. Tuning assembly 54 in this embodiment now comprises a continuous circular element 55 extending parallel to the axis of the anode with a narrow slot 56 for the output coupling. An opening 57 in member 51 provides access for an output pipe 58. A hole 59 provides for evacuation of the overall tube assembly and pin 61 secures the tuning assembly to the tuning mechanism described previously for vertical movement of the structure.

A feature of the invention is that all the component parts may be assembled and brazed in a single operation. Hence, the anode member 1, bottom support plate 10, outer cylindrical member 20, pole piece 12 with extension 13, upper support plate 14, pole piece 15 with extension 16 and output pipe 35 may be assembled with appropriate brazing techniques and the entire assembly may be furnace brazed at one time. Furthermore, the construction is virtually self-aligning in that the tuning crown slides over the pole piece extension and the possibility of wobble or misalignment is eliminated. With reference to the specific illustrative embodiments shown, the anode slots may, of course, be varied to achieve the electrical characteristics desired for any particular magnetron.

What is claimed is:

1. A tunable magnetron comprising an anode defining alternate large and small cavity resonator means radially disposed around a centrally located cathode, a plurality of spaced external cavity resonators circumferentially disposed around said anode, each of said external resonators being coupled only to the large cavity resonators by means disposed in the rear wall of each large anode cavity resonator and a plurality of adjustable tuning means for individually tuning each of said external cavity resonators, said tuning means contacting all the wall surfaces of said external cavity resonators to thereby control the energy coupled between the anode and external cavity resonators.

2. A magnetron according to claim 1 wherein said anode is defined by an inner cylindrical member surrounded by an outer cylindrical member, said outer cylindrical member defining a plurality of recessed wall surfaces which together with the inner cylindrical member define said spaced external cavity resonators.

3. A magnetron according to claim 2 wherein said coupling means comprise slots provided in the outer wall of said inner cylindrical member and said tuning means contact all wall surfaces adjacent to said slots.

References Cited in the file of this patent

UNITED STATES PATENTS

| | | |
|---|---|---|
| 2,734,148 | Azema | Feb. 7, 1956 |
| 2,765,425 | Millman | Oct. 2, 1956 |
| 2,838,712 | Briggs | June 10, 1958 |